(12) United States Patent
Yang et al.

(10) Patent No.: US 10,443,466 B2
(45) Date of Patent: Oct. 15, 2019

(54) UREA INJECTION SYSTEM

(71) Applicant: TENNECO (SUZHOU) EMISSION SYSTEM CO., LTD., Kunshan Suzhou, Jiangsu (CN)

(72) Inventors: Zhenqiu Yang, Kunshan Suzhou (CN); Gaofeng Fan, Kunshan Suzhou (CN); Chao Gong, Kunshan Suzhou (CN)

(73) Assignee: Tenneco (Suzhou) Emission System Co., Ltd., Kunshan Suzhou (CN)

(*) Notice: Subject to any disclaimer, the term of this patent is extended or adjusted under 35 U.S.C. 154(b) by 165 days.

(21) Appl. No.: 15/536,985

(22) PCT Filed: Dec. 15, 2015

(86) PCT No.: PCT/CN2015/097422
§ 371 (c)(1),
(2) Date: Jun. 16, 2017

(87) PCT Pub. No.: WO2016/095808
PCT Pub. Date: Jun. 23, 2016

(65) Prior Publication Data
US 2017/0350290 A1      Dec. 7, 2017

(30) Foreign Application Priority Data

Dec. 16, 2014  (CN) .................... 2014 2 0794022 U

(51) Int. Cl.
*F01N 3/20*       (2006.01)
*F01N 3/28*       (2006.01)
*F01N 9/00*       (2006.01)
(52) U.S. Cl.
CPC ............. *F01N 3/20* (2013.01); *F01N 3/208* (2013.01); *F01N 3/2066* (2013.01); *F01N 3/28* (2013.01);
(Continued)

(58) Field of Classification Search
CPC ............. F01N 2610/02; F01N 2610/14; F01N 2610/1453; F01N 3/20; F01N 9/00
See application file for complete search history.

(56) References Cited

U.S. PATENT DOCUMENTS

2013/0343959 A1   12/2013  Golin et al.
2014/0238504 A1    8/2014  Kregling et al.

FOREIGN PATENT DOCUMENTS

CN       102966416 A       3/2013
CN       103527289 A       1/2014
(Continued)

OTHER PUBLICATIONS

English Translation of CN 204003017 (Year: 2014).*
Schematic illustrating a series of stationary power generators located in New Jersey on or about 2009, 1 page.

*Primary Examiner* — Audrey K Bradley
*Assistant Examiner* — Anthony Ayala Delgado
(74) *Attorney, Agent, or Firm* — Harness, Dickey & Pierce, P.L.C.

(57) ABSTRACT

A urea injection system comprises a fluid conveying apparatus used for extracting a urea solution from a urea tank, several nozzles indirectly connected to the fluid conveying apparatus, and a controller used for controlling the urea injection system. The urea injection system is adapted to process exhaust gas of a plurality of engines at the same time. The nozzles comprise a first nozzle used for injecting a urea solution to a first exhaust pipe of a first engine and a second nozzle used for injecting the urea solution to a second exhaust pipe of a second engine. A plurality of nozzles respectively corresponding to a plurality of engines is arranged in the urea injection system, so as to process exhaust gas of the plurality of engines at the same time by using only one urea injection system.

9 Claims, 13 Drawing Sheets

(52) U.S. Cl.
CPC ............ *F01N 9/00* (2013.01); *F01N 2610/02* (2013.01); *F01N 2610/085* (2013.01); *F01N 2610/14* (2013.01); *F01N 2610/148* (2013.01); *F01N 2610/1433* (2013.01); *F01N 2610/1453* (2013.01); *F01N 2900/1808* (2013.01); *Y02T 10/24* (2013.01)

(56) References Cited

FOREIGN PATENT DOCUMENTS

| | | | |
|---|---|---|---|
| CN | 103842629 A | | 6/2014 |
| CN | 104110293 A | | 10/2014 |
| CN | 204003017 U | * | 12/2014 |
| CN | 204312169 U | | 5/2015 |

* cited by examiner

UREA INJECTION SYSTEM

CROSS REFERENCE TO RELATED APPLICATIONS

This application is a U.S. National Phase Application under 35 U.S.C. 371 of International Application PCT/CN2015/097422, filed on Dec. 15, 2015 and published in Chinese as WO 2016/095808 A1 on Jun. 23, 2016. This application is based on and claims the benefit of priority from Chinese patent application No. 201420794022.5 filed on Dec. 16, 2014 and entitled "urea injection system". The entire disclosures of all of the above applications are incorporated herein by reference.

TECHNICAL FIELD

The present invention relates to a urea injection system in the field of exhaust post-treatment of engines.

BACKGROUND ART

The common-rail system has been applied for a long time in the fuel injection system of engines. The structure of the common rail for fuel injection is greatly constrained because it needs to withstand a high pressure. Since a cylindrical structure can withstand a higher pressure than other structures, the cylindrical structure is adopted for almost all existing common rails for fuel injection.

As the standards for exhaust emission in the countries all over the world are increasingly becoming more strict, more requirements are put forward for the urea injection system used for exhaust treatment. How to control the pressure in the urea injection system is a common technical problem in the industry.

In addition, it is a practice in the prior art that an engine is usually equipped with a urea injection system. The installation and control in such a configuration mode are both relatively complex.

SUMMARY OF THE INVENTION

The objective of the present invention is to provide a urea injection system which can simultaneously treat exhaust of a plurality of engines.

To realize the above-mentioned objective, the following technical solution is adopted for the present invention: a urea injection system, which comprises a fluid conveying apparatus used for extracting a urea solution from a urea tank, a common rail connected to said fluid conveying apparatus, a plurality of nozzles connected to said common rail, and a controller used for controlling said urea injection system, said common rail comprising a housing, and a pressure detection apparatus and a pressure adjustment apparatus installed on said housing, said housing comprising an inlet passage where a urea solution enters, an outlet passage where the urea solution flows out, a plurality of conveyance ports connected to said inlet passage, and a plurality of return flow ports connected to said outlet passage, said pressure detection apparatus being connected to said inlet passage, said pressure adjustment apparatus being connected between said inlet passage and said outlet passage, said pressure adjustment apparatus being able to connect or disconnect said inlet passage and said outlet passage; said urea injection system is also suitable for treating exhaust of a plurality of engines, said plurality of nozzles include a first nozzle used to inject a urea solution into a first exhaust pipe connected to a first engine and a second nozzle used to inject a urea solution into a second exhaust pipe connected to a second engine.

As a further improved technical solution of the present invention, said first exhaust pipe and said second exhaust pipe are mutually independent.

As a further improved technical solution of the present invention, said urea injection system comprises a first inflow pipe and a first return flow pipe connected to the first nozzle, wherein said first inflow pipe is connected to the corresponding conveyance port, said first return flow pipe is connected to the corresponding return flow port; said urea injection system further comprises a second inflow pipe and a second return flow pipe connected to the second nozzle, wherein said second inflow pipe is connected to the corresponding conveyance port and said second return flow pipe is connected to the corresponding return flow port; said urea injection system further comprises a return flow pipeline connecting said outlet passage and said urea tank.

As a further improved technical solution of the present invention, said housing roughly takes the shape of a cuboid, and comprises a first end face, a second end face, a third end face, and a fourth end face, wherein said first end face is set opposite said second end face, and said third end face is set opposite said fourth end face; said inlet passage and said outlet passage run through said first end face and/or second end face, said conveyance port runs through said third end face, and said return flow port runs through said fourth end face.

As a further improved technical solution of the present invention, said common rail is equipped with a conveyance connector connected to each conveyance port and a return flow connector connected to each return flow port, the number of said return flow connectors is the same as the number of said conveyance connectors, said inlet passage and said outlet passage are parallel to each other, said conveyance connector is perpendicular to said inlet passage, and said return flow connector is perpendicular to said outlet passage.

As a further improved technical solution of the present invention, said fluid conveying apparatus comprises an integrated cabinet, a pump installed in said integrated cabinet, an inlet pipeline connected to said pump, and an outlet pipeline connected to said pump, said pump comprises a motor located at the bottom, a pump head located at the top, and a magnetic coupling portion located between said motor and said pump head, said pump head, said magnetic coupling portion, and said motor are arranged from the top down, and a U-shaped flow path and a gear mechanism located in the very bottom of said flow path are provided in said pump head.

As a further improved technical solution of the present invention, said inlet pipeline and said outlet pipeline are respectively connected to the two ends of said flow path, and said inlet pipeline, said outlet pipeline, and said pump head are interconnected to form the shape of an inverted U.

As a further improved technical solution of the present invention, said integrated cabinet is equipped with a bottom wall, said inlet pipeline is equipped with a pre-pump monitoring module near said bottom wall, an inlet pipe connecting said pre-pump monitoring module and extending vertically, and an inlet connection pipe connecting said inlet pipe and said pump head; said outlet pipeline is equipped with a post-pump monitoring module near said bottom wall, an outlet pipe connecting said post-pump monitoring module and extending vertically, and an outlet connection pipe connecting said outlet pipe and said pump head.

As a further improved technical solution of the present invention, a negative pressure sensor and a urea temperature sensor are installed on said pre-pump monitoring module, a pressure sensor is installed on said post-pump monitoring module, said pre-pump monitoring module and said post-pump monitoring module both pass through said bottom wall, a urea extraction interface is provided in said pre-pump monitoring module, a urea output interface is provided in said post-pump monitoring module, and said urea extraction interface and said urea output interface are both located at the bottom of said integrated cabinet; said magnetic coupling portion comprises a driving magnetic driver and a driven magnetic driver, a pump head input shaft is provided on said driven magnetic driver, said pump head input shaft is connected to said gear mechanism, and said controller is located in said integrated cabinet.

The following technical solution can also be adopted for the present invention: a urea injection system, which comprises a fluid conveying apparatus used for extracting a urea solution from a urea tank, a plurality of nozzles used for injecting a urea solution into the exhaust pipe, a plurality of urea solution distribution connectors connected between said fluid conveying apparatus and said plurality of nozzles, and a controller used for controlling said urea injection system, said urea injection system being also suitable for treating exhaust of a plurality of engines, said plurality of nozzles including a first nozzle used to inject a urea solution into a first exhaust pipe connected to a first engine and a second nozzle used to inject a urea solution into a second exhaust pipe connected to a second engine; said urea injection system comprising a first inflow pipe and a first return flow pipe connected to the first nozzle, and a second inflow pipe and a second return flow pipe connected to the second nozzle; said plurality of urea solution distribution connectors including a first tee connector and a second tee connector connected in series, wherein said first tee connector is equipped with an outlet connected to said first inflow pipe, and said second tee connector is equipped with an outlet connected to said second inflow pipe.

Compared with the prior art, the present invention makes it possible that one urea injection system can simultaneously treat the exhaust of a plurality of engines by setting a plurality of nozzles which respectively correspond to a plurality of engines.

DESCRIPTION OF THE PARTICULAR EMBODIMENTS

To make clearer the objective, technical solution, and advantages of the present invention, the following will further describe the present invention in detail in combination with drawings and specific embodiments.

Figure 1:
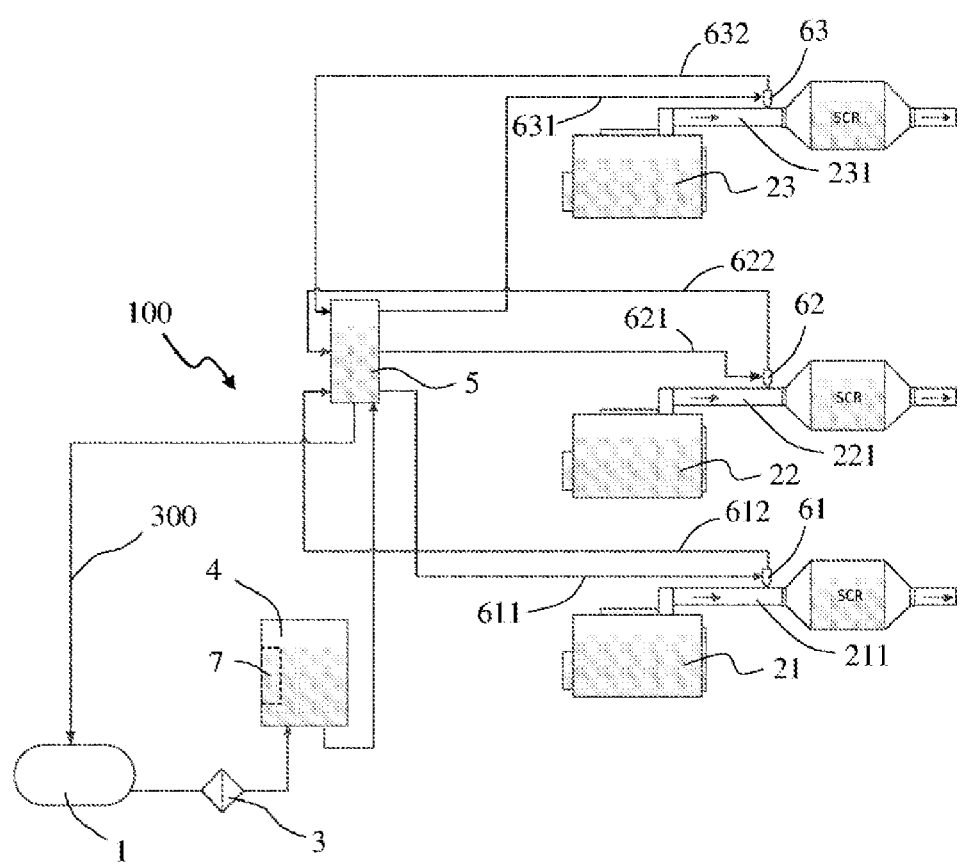
FIG. 1 is a schematic diagram for the urea injection system used for treating exhaust of a plurality of engines.
Figure 2:
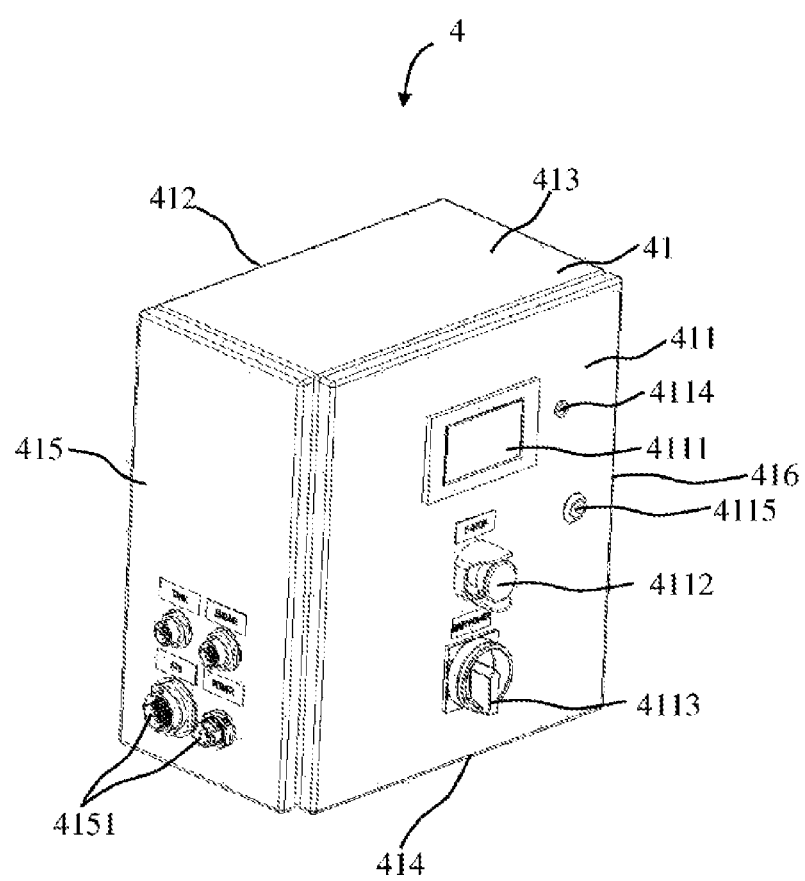
FIG. 2 is a 3-D view of the fluid conveying apparatus shown in FIG. 1.
Figure 3:
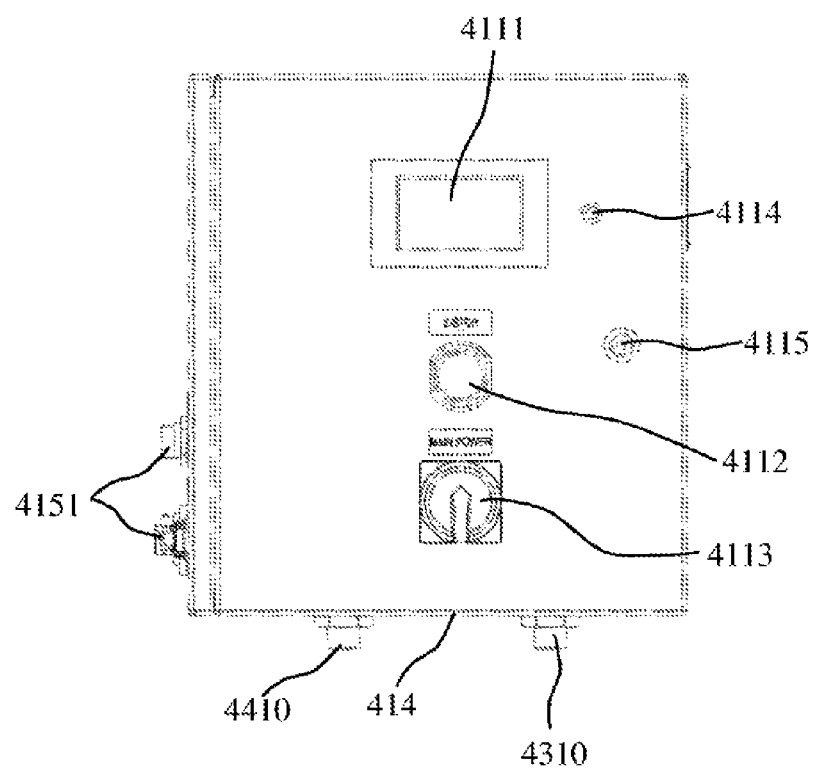
FIG. 3 is a front view of FIG. 2.

As shown in FIG. 1, the present invention discloses a urea injection system (100), which is also suitable for treating the exhaust of a plurality of engines. In the illustrated implementation mode of the present invention, said engines include a first engine (21), a second engine (22), and a third engine (23). Said first engine (21) is connected to a first exhaust pipe (211), and a selective catalytic reducer (SCR) is installed at the rear of said first exhaust pipe (211). Said second engine (22) is connected to a second exhaust pipe (221), and an SCR is also installed at the rear of said second exhaust pipe (221). Said third engine (23) is connected to a third exhaust pipe (231), and an SCR is also installed at the rear of said third exhaust pipe (231). The powers of said first, second, and third engines (21, 22, and 23) can be the same or different. As shown in FIG. 1, in the illustrated implementation mode of the present invention, said first exhaust pipe (211), second exhaust pipe (221), and third exhaust pipe (231) are independent of each other. Of course, said first exhaust pipe (211), second exhaust pipe (221), and third exhaust pipe (231) can be gathered together to make exhaust pass through the SCR in other implementation modes.

Said urea injection system (100) comprises a urea tank (1), a filter (3), a fluid conveying apparatus (4) used for extracting a urea solution from said urea tank (1), a common rail (5) connected to said fluid conveying apparatus (4), a plurality of nozzles connected to said common rail (5), and a controller (7) used for controlling said urea injection system (100).

Figure 4:
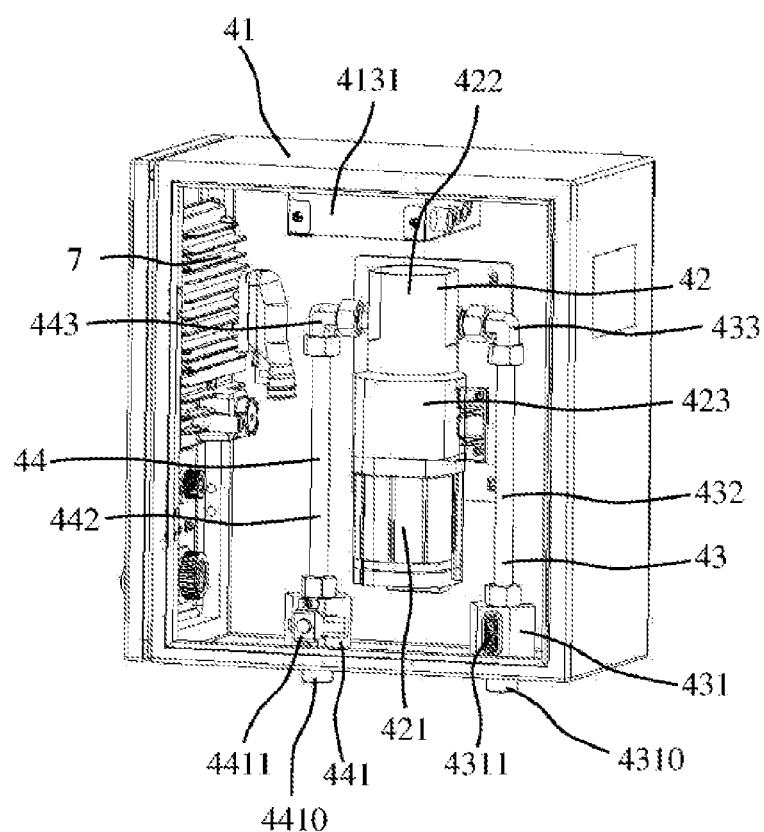
FIG. 4 is a 3-D view of the fluid conveying apparatus shown in FIG. 2, with the front wall removed.

As shown in FIG. 2 to FIG. 5, said fluid conveying apparatus (4) comprises an integrated cabinet (41), a pump (42) installed in said integrated cabinet (41), an inlet pipeline (43) located at one side of said pump (42), and an outlet pipeline (44) located at the other side of said pump (42). As shown in FIG. 4, in the illustrated implementation mode of the present invention, said controller (7) is installed in said integrated cabinet (41).

Said integrated cabinet (41) roughly takes the shape of a cuboid, and comprises a front wall (411), a rear wall (412), a top wall (413), a bottom wall (414), a first side wall (415), and a second side wall (416). In the illustrated implementation mode of the present invention, said front wall (411) is the main operation interface, and a man-machine interface (4111), an emergency stop switch (4112), a main power switch (4113), a monitoring indicator (4114), and a door lock (4115) are provided on said front wall (411). Said man-machine interface (4111), said emergency stop switch (4112), and said main power switch (4113) are arranged in the middle of said front wall (411) and are arranged in the vertical direction in sequence from the top down. With such settings, said main operation interface satisfies the concise and symmetric aesthetics design as a whole. Said man-machine interface (4111), said emergency stop switch (4112), and said main power switch (4113) are all centered between the left and right of said front wall (411), and their positions from the top and bottom comply with the principle of man-machine engineering to guarantee good comfort of line-of-sight of operations. When an emergency happens in the system, said emergency stop switch (4112) can quickly disconnect the power source of the system to guarantee the safety of the system in compliance with the maximum principle. Said monitoring indicator (4114) can monitor online and display the working state of the system in real time. In the illustrated implementation mode of the present invention, said monitoring indicator (4114) is a tri-color (for example, red, yellow, and green) lamp. Said tri-color lamp is one lamp, and in different working states, the monitoring indicator (4114) displays lamp light of different colors at different frequencies. The working state of said system can clearly be learned according to the display of said lamp light. Compared with the adoption of three lamps to display different colors in the prior art, the tri-color lamp in the present invention can save on cost and can facilitate layout. In the illustrated implementation mode of the present invention, said door lock (4115) is a Yin-Yang triangle opening/closing structure, which gives the system an excellent physical safety feature.

A plurality of wiring harness connectors (4151) are installed on said first side wall (415), and said wiring harness connectors (4151) are inwardly connected to said controller (7), said pump (42), and various sensors respectively, and are outwardly connected to external signals of the system and the power supply respectively. In the illustrated implementation mode of the present invention, said wiring harness connectors (4151) are all close to the bottom of said integrated cabinet (41) so that the vibration severity of said wiring harness connectors (4151) is lowered. Said controller (7) is located at the inner side of said first side wall (415).

Figure 5:
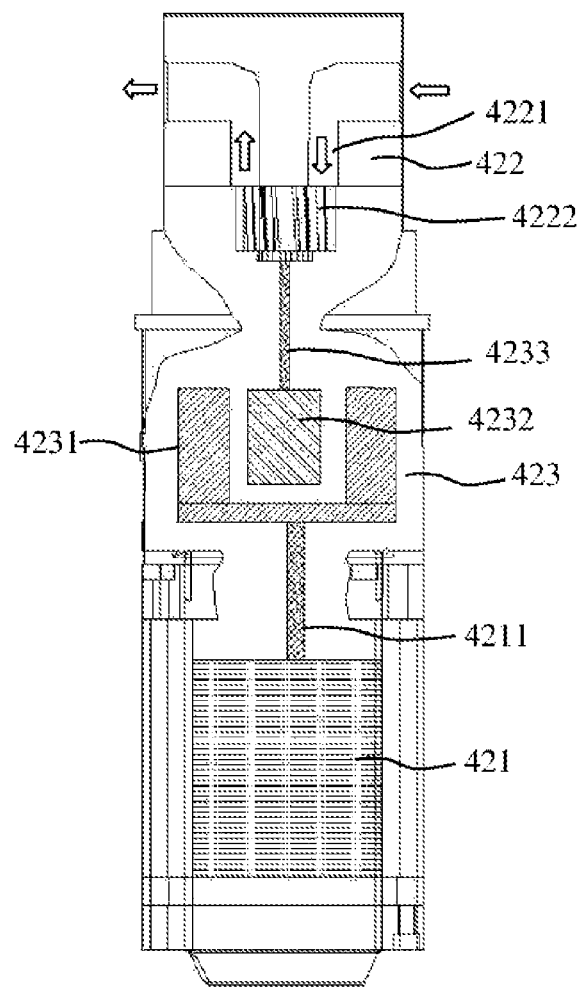
FIG. 5 is a cutaway view of the motor in the fluid conveying apparatus shown in FIG. 4.
Figure 6:
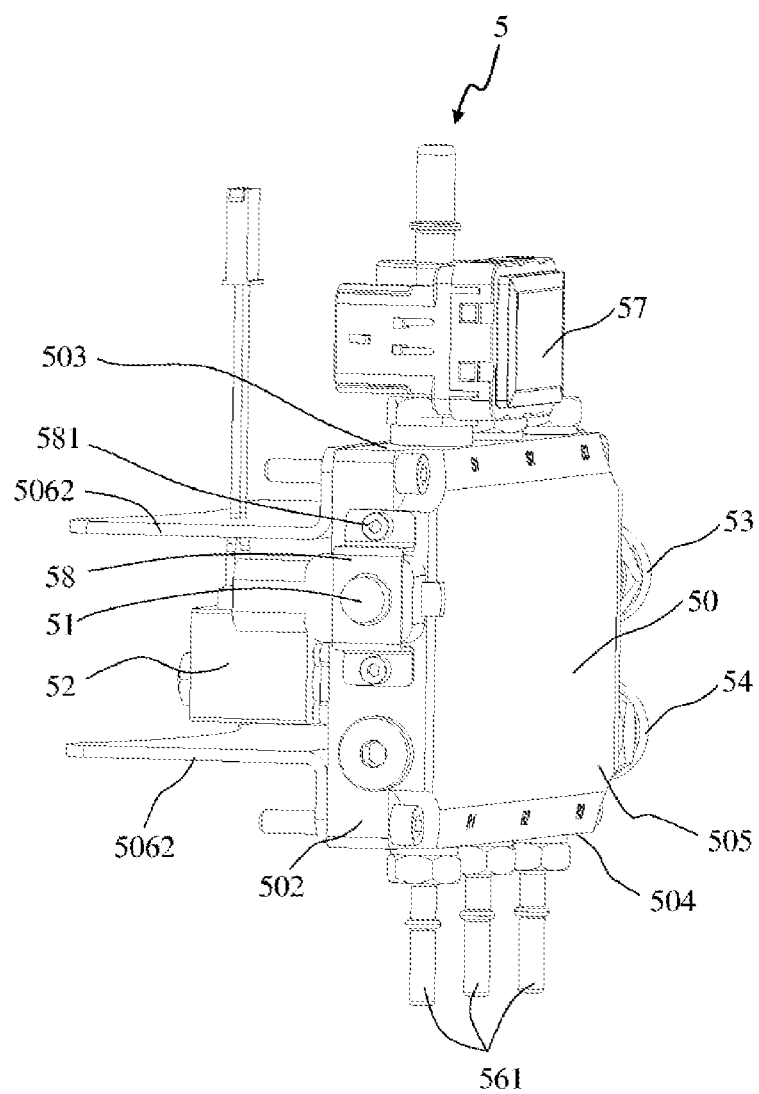
FIG. 6 is a 3-D view of the common rail shown in FIG. 1.

As shown in FIG. 4, in the illustrated implementation mode of the present invention, said pump (42) is a gear pump. Said pump (42) comprises a motor (421) located at the bottom, a pump head (422) located at the top, and a magnetic coupling portion (423) located between said motor (421) and said pump head (422). As shown in FIG. 5, said motor (421) comprises a motor output shaft (4211). A U-shaped urea flow path (4221) and a gear mechanism (4222) located in the very bottom of said urea flow path (4221) are equipped in said pump head (422). Said magnetic coupling portion (423) comprises a driving magnetic driver (4231) and a driven magnetic driver (4232). Said motor output shaft (4211) is connected and fastened to said driving magnetic driver (4231). Said driven magnetic driver (4232) is equipped with a pump head input shaft (4233), and said pump head input shaft (4233) is connected and fastened to said gear mechanism (4222).

When the system is working, said motor (421) is powered on, said motor output shaft (4211) drives the rotation of said driving magnetic driver (4231), then said driving magnetic driver (4231) drives the rotation of the pump head input shaft (4233), and said pump head input shaft (4233) further drives the rotation of the gear mechanism (4222) so that said urea solution flows in the direction of the arrow and the pressure of the urea solution at the outlet is increased. In the illustrated implementation mode of the present invention, since said gear mechanism (4222) is located in the very bottom of said urea flow path (4221), the bubbles in the urea solution can be prevented from accumulating in said pump head (422), thus ensuring the working efficiency in pumping the liquid and the control precision of the delivery volume.

Said inlet pipeline (43) comprises a pre-pump monitoring module (431) located at the bottom end, an inlet pipe (432) connected to said pre-pump monitoring module (431), and an inlet connection pipe (433) connecting said inlet pipe (432) to said pump head (422). Said inlet pipeline (43) connected with a plurality of components makes maintenance convenient. In the illustrated implementation mode of the present invention, said pre-pump monitoring module (431) is a hexagonal-faced structure and is characterized by high reliability, compactness, and a light weight. A negative pressure sensor (4311) and a urea temperature sensor are installed on said pre-pump monitoring module (431), wherein it can be determined whether said filter (3) needs to be replaced by monitoring said negative pressure sensor (4311).

Similarly, said outlet pipeline (44) comprises a post-pump monitoring module (441) located at the bottom end, an outlet pipe (442) connected to said post-pump monitoring module (441), and an outlet connection pipe (443) connecting said outlet pipe (442) to said pump head (422). Said outlet pipeline (44) connected with a plurality of components makes maintenance convenient. In the illustrated implementation mode of the present invention, said post-pump monitoring module (441) is a hexagonal-faced structure and is characterized by high reliability, compactness, and a light weight. A pressure sensor (4411) is installed on said post-pump monitoring module (441) to detect the pressure at the high-pressure section.

In the illustrated implementation mode of the present invention, through-hole installation is adopted for both said pre-pump monitoring module (431) and said post-pump monitoring module (441), that is to say, said pre-pump monitoring module (431) and said post-pump monitoring module (441) both pass through the bottom wall (414) of said integrated cabinet (41). A urea extraction interface (4310) is provided in said pre-pump monitoring module (431), a urea output interface (4410) is provided in said post-pump monitoring module (441), and said urea extraction interface (4310) and said urea output interface (4410) are both located in the bottom of said integrated cabinet (41) so that the running and layout of external urea pipelines can fully be protected, and mechanical collisions and contamination from other liquids and dust can be avoided. In addition, said pre-pump monitoring module (431) and said post-pump monitoring module (441) are both designed to be parallel to the urea pipelines to minimize the pressure loss.

In the illustrated implementation mode of the present invention, said pump (42) is arranged in the vertical direction, said pump head (422) vertically faces upward. On the one hand, based on the magnetic drive mechanism, the centering performance of said driving magnetic driver (4231) and driven magnetic driver (4232) can be guaranteed and the transfer efficiency of the magnetic driving force in the pump assembly can be improved; on the other hand, the bubbles in the urea solution can be prevented from accumulating in the pump, thus ensuring the working efficiency of said pump (42) pumping the liquid and the control precision of the delivery volume.

As shown in FIG. 4, a pump driving module (4131) installed at the inner side of said top wall (413) is equipped in said integrated cabinet (41). Such a design makes it possible to put said pump driving module (4131) in a relatively high position, thus avoiding any short-circuit caused by overflow of a urea solution. Said pump driving module (4131) touches closely against said top wall (413). With such a setting, the heat produced when said pump driving module (4131) is working can dissipate in time so that a normal working temperature can be guaranteed for said pump driving module (4131). In addition, since said pump driving module (4131) is close to said pump head (422), the urea solution in said pump head (422) will also carry away some of the thermal energy radiated by said pump driving module (4131).

As shown in FIG. 6 to FIG. 12, said common rail (5) is used to adjust the pressure in said urea injection system (100). To be specific, said common rail (5) comprises a housing (50), a pressure detection apparatus (51) and a pressure adjustment apparatus (52) installed on said housing (50), an inlet connector (53) connected to said fluid conveying apparatus (4) with a high-pressure pipeline, and an outlet connector (54) connected to said urea tank (1) with a return flow pipeline (300).

Figure 10:
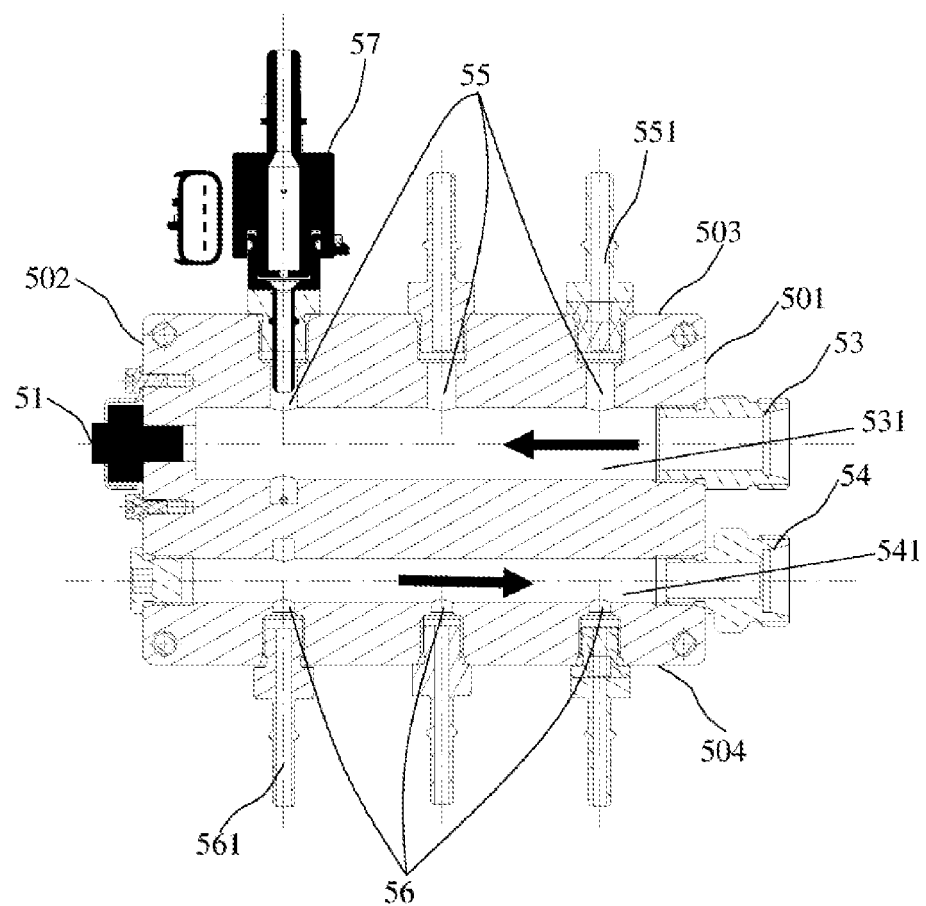
FIG. 10 is a cutaway view of the common rail.
Figure 11:
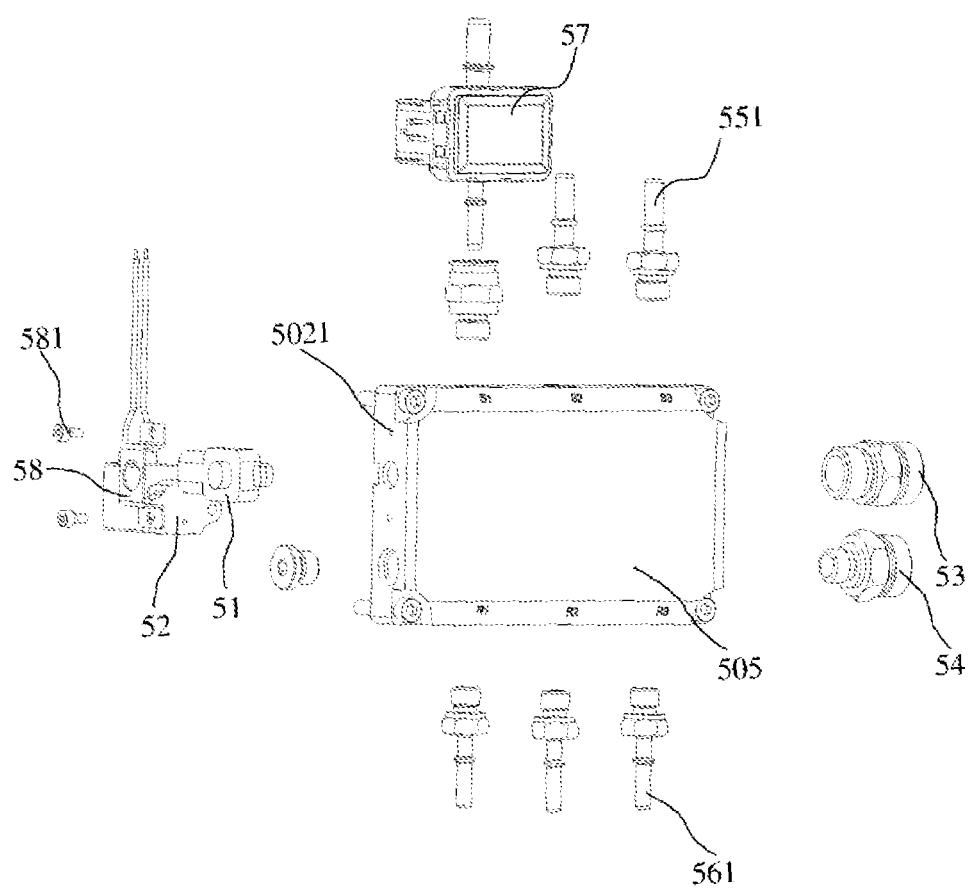
FIG. 11 is an exploded 3-D view of the common rail with the mounting plates removed.
Figure 12:
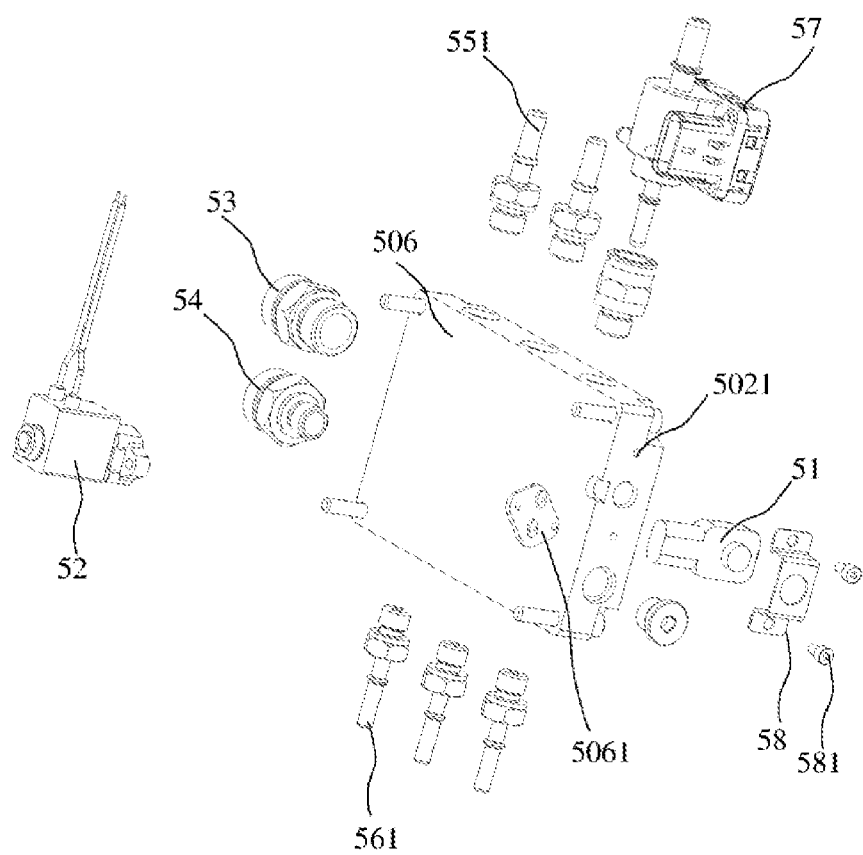
FIG. 12 is an exploded 3-D view of another angle in FIG. 11.

As shown in FIG. 10, said housing (50) roughly takes the shape of a cuboid, and comprises a first end face (501), a second end face (502), a third end face (503), a fourth end face (504), a front face (505), and a back face (506) opposite said front face (505), wherein, said first end face (501) is set opposite said second end face (502); said third end face (503) is set opposite said fourth end face (504); said front (505) is perpendicular to all of said first end face (501), second end face (502), third end face (503), and fourth end face (504). Said inlet connector (53) and said outlet connector (54) are installed on said first end face (501) and/or said second end face (502). In the illustrated implementation mode of the present invention, said inlet connector (53) and said outlet connector (54) are installed on said first end face (501). Said second end face (502) is equipped with threaded holes (5021), and in the illustrated implementation mode of the present invention, said pressure detection apparatus (51) is a pressure sensor, which is installed on said second end face (502) and connects said inlet passage (531). In the illustrated implementation mode of the present invention, said pressure adjustment apparatus (52) is a pressure control valve, which is installed in said mounting groove (5061) and is located between mounting plates (5062). With such settings, said mounting plates (5062) can protect said pressure control valve. Functionally, said pressure control valve is connected between said inlet passage (531) and said outlet passage (541), and said pressure control valve can connect or disconnect said inlet passage (531) and said outlet passage (541). For example, when said pressure sensor detects that the pressure in said inlet passage (531) is greater than a set value, said controller (7) opens said pressure control valve to realize pressure relief.

The common rail (5) in the present invention is quite different from the existing common rails for fuel injection. First of all, a lot of data analysis shows that the pressure which the common rail (5) of the present invention, applied in the urea injection system, needs to withstand is far lower than what the common rail for fuel injection withstands. Based on such analysis, the cuboid housing (50) disclosed in the present invention has high machinability. More importantly, this provides a feasible solution for the integration of the outlet passage (541) into said common rail (5). In the illustrated implementation mode of the present invention, the diameter of said inlet passage (531) is of course greater than the diameter of said outlet passage (541). The reason for such a design is that scientific analysis shows that the pressures which said inlet passage (531) and said outlet passage (541) need to withstand are also different.

Figure 7:
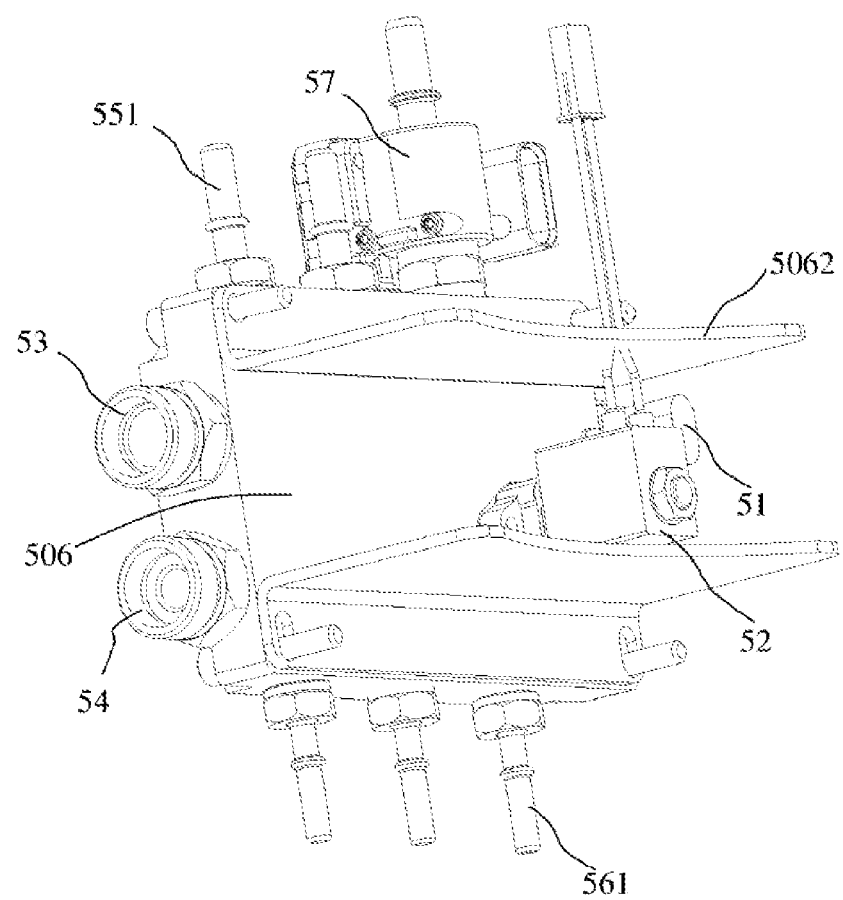
FIG. 7 is a 3-D view of another angle in FIG. 6.
Figure 8:
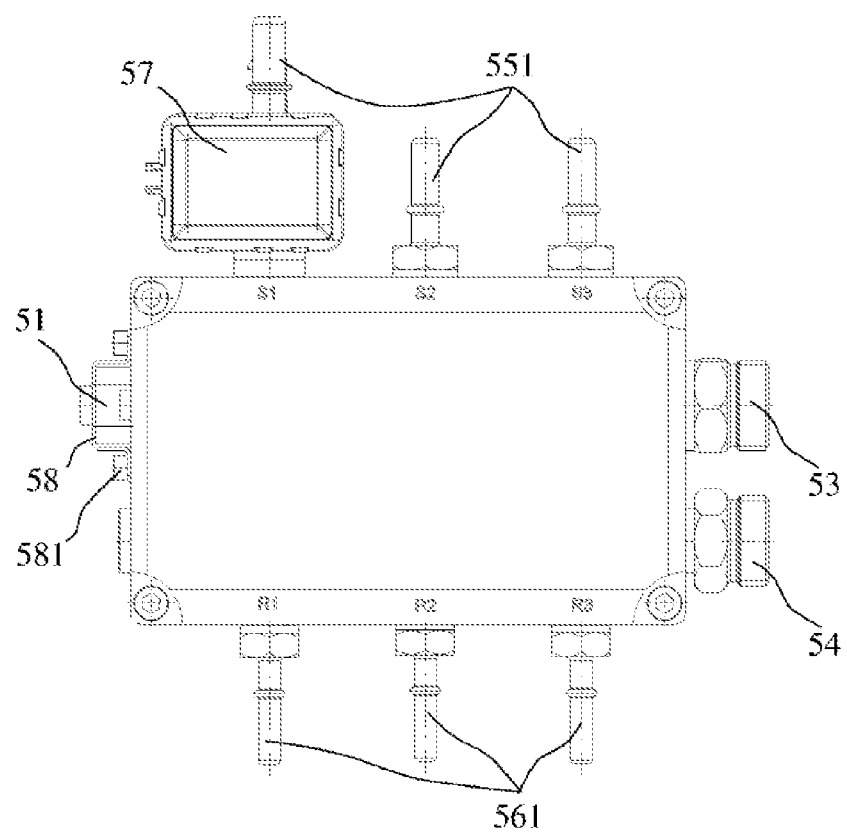
FIG. 8 is a front view of the common rail.
Figure 9:
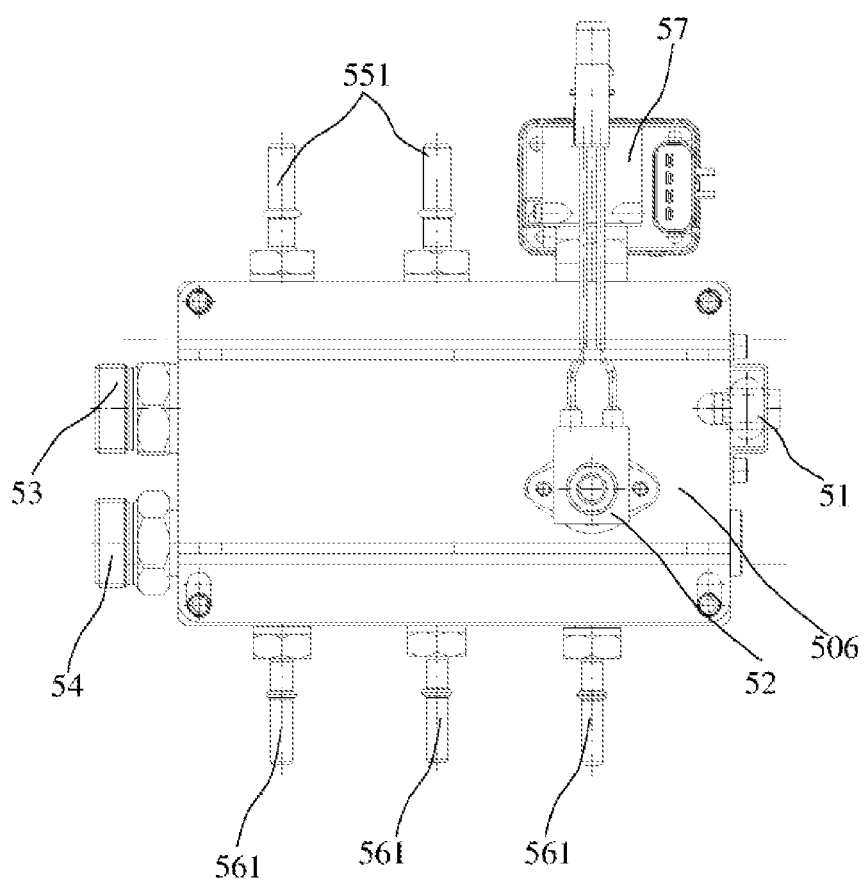
FIG. 9 is a rear view of the common rail.

As shown in FIG. 7, said common rail (5) further comprises a fastening piece (58) which is held on the outside of said pressure sensor (51), said fastening piece (58) is locked together with said threaded hole (5021) through a bolt (581) to fasten said pressure sensor (52) onto said housing (50).

The pressure control valve installed on said common rail (5) has three functions: 1. helping to build up the pressure in the urea pipeline, 2. stabilizing and controlling the pressure after the pressure is built up, 3. with the aid of contra-rotations of said pump (42), drawing the air in said urea tank (1) into the pipeline of said urea injection system to evacuate the urea solution from said pipeline before said urea injection system (100) stops.

To be specific, when the system just starts to build up pressure, a lot of air may exist in the pipeline. However, the compressibility of air easily leads to a pressure buildup failure. The pressure control valve designed in the present invention skillfully solves the problem. When the system just starts to build up a pressure, said controller (7) controls the opening of said pressure control valve (for example, keeps said pressure control valve at a certain fixed opening angle or a changing opening angle) to connect said inlet passage (531) and said outlet passage (541) to provide one channel to release the air in the pipeline so that a pressure can quickly be built up in the pipeline.

After the pressure buildup of the system is completed, said controller will quickly adjust the opening angle of said pressure control valve to ensure that the urea pressure in said common rail (5) is maintained around a set pressure and basically remains constant, thus achieving the aim of adjusting the pressure by controlling the return flow volume of the urea solution.

Before said urea injection system (100) stops, said controller (7) opens said pressure control valve, said pump (42) contra-rotates to draw the air in said urea tank (1) into the pipeline of said urea injection system to evacuate the urea solution from said pipeline. It should be noted that "before said urea injection system (100) stops" means that said controller (7) has already received the signal indicating that the system is to stop. At this time, said nozzle has already stopped injection, but said pump (42) is still rotating (for example, contra-rotating). The purpose of evacuating the urea solution from said pipeline is to prevent the system from being damaged by freezing or expansion of the urea solution.

As shown in FIG. 10, said housing (50) further comprises said inlet passage (531) connected to the inlet connector (53), said outlet passage (541) connected to the outlet connector (54), at least one conveyance port (55) connected to said inlet passage (531), and at least one return flow port (56) connected to said outlet passage (541). Said inlet passage (531) and said outlet passage (541) pass through said first end face (501) and/or second end face (502). In the illustrated implementation mode of the present invention, said inlet passage (531) and said outlet passage (541) both pass through said first end face (501). Said inlet passage (531) and said outlet passage (541) are parallel to each other, thus facilitating machining. In the illustrated implementation mode of the present invention, a plurality of said conveyance ports (55) are provided. To be specific, three conveyance ports (55) and three conveyance connectors (551) connected to said conveyance ports (55) are set on said third end face (503). Each conveyance connector (551) is perpendicular to said inlet passage (531). Said three conveyance connectors (551) are arranged at intervals between said first end face (501) and second end face (502). In the illustrated implementation mode of the present invention, a urea mass sensor (57) is installed on the conveyance connector (551) close to said third end face (503). Of course, in other implementation modes, said urea mass sensor (57) can also be installed on any conveyance connector (551); or a urea mass sensor (57) can also be installed on all three conveyance connectors (551). In the illustrated implementation mode of the present invention, the number of said return flow ports (56) is also three, and said three return flow ports (56) and three return flow connectors (561) connected to said return flow ports (56) are set on said fourth end face (504). Each return flow connector (561) is perpendicular to said outlet passage (541). Said three return flow connectors (561) are also arranged at intervals between said first end face (501) and second end face (502). Said conveyance ports (55) run through said third end face (503), and said return flow ports (56) run through said fourth end face (504). The number of said return flow connectors (561) is the same as the number of said conveyance connectors (551), but their mounting directions are opposite. Each conveyance port (55) is aligned with a corresponding return flow port (56).

As shown in FIG. 1, in the illustrated implementation mode of the present invention, said nozzles include a first nozzle (61) used to inject a urea solution into a first exhaust pipe (211) of a first engine (21), a second nozzle (62) used to inject a urea solution into a second exhaust pipe (221) of a second engine (22), and a third nozzle (63) used to inject a urea solution into a third exhaust pipe (231) of a third engine (23). Said urea injection system (100) comprises a first inflow pipe (611) and a first return flow pipe (612) connected to the first nozzle (61), a second inflow pipe (621) and a second return flow pipe (622) connected to the second nozzle (62), and a third inflow pipe (631) and a third return flow pipe (632) connected to the third nozzle (63), wherein, said first, second, and third inflow pipes (611, 621, and 631) are connected to the corresponding conveyance ports (55), and said first, second, and third return flow pipes (612, 622, and 632) are connected to the corresponding return flow ports (56). With such settings, on the one hand, said first, second, and third nozzles (61, 62, and 63) can inject a urea solution into said first, second, and third exhaust pipes (211, 221, and 231) for a chemical reaction, and on the other hand, the urea solution flowing back can be utilized to cool said nozzles. The urea solution flowing back first gathers in said common rail (5) through the first, second and third return flow pipelines (612, 622, and 632), and then uniformly flows back to said urea tank (1) through the return flow pipeline (300). In the prior art, a solution where said return flow pipelines are directly introduced into said urea tank (1) is usually adopted. In such a solution, each nozzle requires an independent return flow pipeline, and thus the cost is very high. In addition, in the applications of the present invention, especially in the exhaust treatment system of a high-power engine, the pipelines between said urea tank (1) and said nozzles are often long, and the existing return flow design cannot satisfy the requirements.

Under the control of said controller (7), the common rail (5) in the present invention can realize centralized control and management of the injected solution and can stabilize the pressure of the urea solution. The number of said inflow pipes and return flow pipes will vary with the number of engines and the power thereof. In addition, said controller (7) determines the real-time working conditions of each engine according to the inlet pressure, inlet temperature, inlet humidity, and rotational speed of each engine. The controller determines the volume of a urea solution to be injected into each exhaust pipe according to different working conditions of each engine, thus realizing control and coordination between a plurality of engines.

Figure 13:
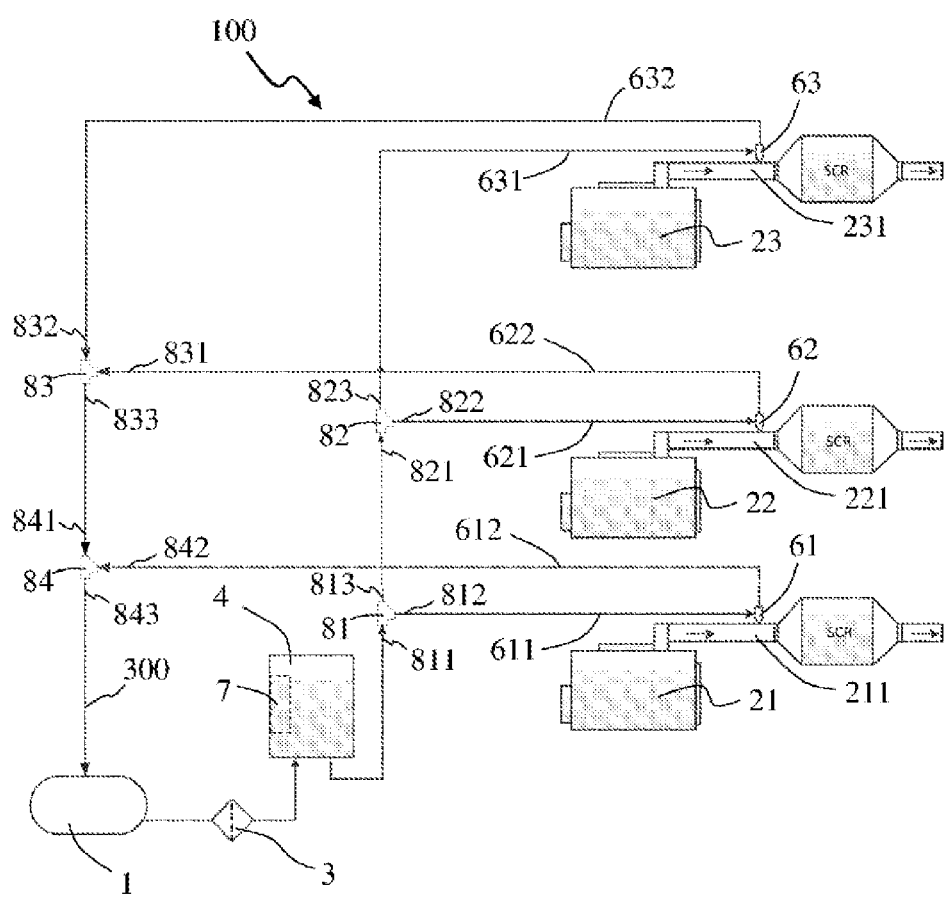
FIG. 13 is a schematic diagram for the urea injection system used for treating exhaust of a plurality of engines in another implementation mode.

As shown in FIG. 13, in another implementation mode of the present invention, no common rail (5) is used, but a plurality of urea solution distribution connectors are used. Said plurality of urea solution distribution connectors are connected between said fluid conveying apparatus (4) and said pump nozzles to distribute the urea solution pumped out of said fluid conveying apparatus (4) to corresponding nozzles. To be specific, in the illustrated implementation mode of the present invention, said urea solution distribution connectors include a first tee connector (81) and a second tee connector (82), wherein an inlet (811) of said first tee connector (81) is connected to the urea output interface (4410) of said fluid conveying apparatus (4), one of the outlets (812) of said first tee connector (81) is connected to said first inflow pipe (611), and the other outlet (813) is connected to an inlet (821) of said second tee connector (82). In addition, one of the outlets (822) of said second tee connector (82) is connected to said second inflow pipe (621), and the other outlet (823) is connected to said third inflow pipe (631).

In addition, in the implementation mode shown in FIG. 13, said urea injection system (100) further comprises a third tee connector (83) and a fourth tee connector (84) used for collecting the return flow urea, wherein the two inlets (831 and 832) of said third tee connector (83) are respectively connected to the second and third return flow pipes (622 and 632), and the outlet (833) is connected to one inlet (841) of said fourth tee connector (84). The other inlet (842) of said fourth tee connector (84) is connected to the first return flow pipe (612), and an outlet (843) of said fourth tee connector (84) is connected to said return flow pipeline (300) to let cooled urea uniformly return to said urea tank (1).

The urea injection system (100) in the present invention can satisfy the exhaust post-treatment requirements of a set of engines with a total power less than a threshold (for example, 12000 kilowatts), regardless of the type and power rating of each engine. If the total power does not exceed said threshold, the number of engines will not affect the operation of the system.

In addition, the above-mentioned embodiments are only used to describe the present invention, but not restrict the technical solutions described for the present invention. The understanding of the specification, for example, the description of directions such as front, back, left, right, top, and bottom, should be based on those skilled in the art. Although a detailed description of the present invention is given in the specification with reference to the above-mentioned embodiments, those skilled in the art should understand that a person skilled in the art can still make modifications to or equivalent replacements in the present invention. Technical solutions and improvements without departing from the spirit and scope of the present invention should all fall within the scope of the claims of the present invention.

The invention claimed is:

1. A urea injection system, which comprises:
 a fluid conveying apparatus used for extracting a urea solution from a urea tank,
 a common rail connected to said fluid conveying apparatus,
 a plurality of nozzles connected to said common rail, and
 a controller used for controlling said urea injection system, wherein said common rail comprises a housing, and a pressure detection apparatus and a pressure adjustment apparatus installed on said housing, said housing comprises an inlet passage where a urea solution enters, an outlet passage where the urea solution flows out, a plurality of conveyance ports connected to said inlet passage, and a plurality of return flow ports connected to said outlet passage, said pressure detection apparatus is connected to said inlet passage, said pressure adjustment apparatus is connected between said inlet passage and said outlet passage, said pressure adjustment apparatus is able to connect or disconnect said inlet passage and said outlet passage; said urea injection system is also suitable for treating exhaust of a plurality of engines, said plurality of nozzles include a first nozzle used to inject a urea solution into a first exhaust pipe connected to a first engine and a second nozzle used to inject a urea solution into a second exhaust pipe connected to a second engine, wherein said urea injection system comprises a first inlet pipe and a first return flow pipe connected to the first nozzle, wherein said first inlet pipe is connected to the corresponding conveyance port, said first return flow pipe is connected to the corresponding return flow port; said urea injection system further comprises a second inflow pipe and a second return flow pipe connected to the second nozzle, wherein said second inflow pipe is connected to the corresponding conveyance port, and said second return flow pipe is connected to the corresponding return flow port; said urea injection system further comprises a return pipeline connecting said outlet passage and said urea tank.

2. The urea injection system as claimed in claim 1, wherein said first exhaust pipe and said second exhaust pipe are independent of each other.

3. A urea injection system, which comprises:
a fluid conveying apparatus used for extracting a urea solution from a urea tank,
a common rail connected to said fluid conveying apparatus,
a plurality of nozzles connected to said common rail, and
a controller used for controlling said urea injection system, wherein said common rail comprises a housing, and a pressure detection apparatus and a pressure adjustment apparatus installed on said housing, said housing comprises an inlet passage where a urea solution enters, an outlet passage where the urea solution flows out, a plurality of conveyance ports connected to said inlet passage, and a plurality of return flow ports connected to said outlet passage, said pressure detection apparatus is connected to said inlet passage, said pressure adjustment apparatus is connected between said inlet passage and said outlet passage, said pressure adjustment apparatus is able to connect or disconnect said inlet passage and said outlet passage; said urea injection system is also suitable for treating exhaust of a plurality of engines, said plurality of nozzles include a first nozzle used to inject a urea solution into a first exhaust pipe connected to a first engine and a second nozzle used to inject a urea solution into a second exhaust pipe connected to a second engine, wherein said housing roughly takes the shape of a cuboid, and comprises a first end face, a second end face, a third end face, and a fourth end face, wherein said first end face is set opposite said second end face, and said third end face is set opposite said fourth end face; said inlet passage and said outlet passage run through said first end face and/or second end face, said conveyance port runs through said third end face, and said return flow port runs through said fourth end face.

4. The urea injection system as claimed in claim 3, wherein said common rail is equipped with a conveyance connector connected to each conveyance port and a return flow connector connected to each return flow port, the number of said return flow connectors is the same as the number of said conveyance connectors, said inlet passage and said outlet passage are parallel to each other, said conveyance connector is perpendicular to said inlet passage, and said return flow connector is perpendicular to said outlet passage.

5. A urea injection system, which comprises:
a fluid conveying apparatus used for extracting a urea solution from a urea tank,
a common rail connected to said fluid conveying apparatus,
a plurality of nozzles connected to said common rail, and
a controller used for controlling said urea injection system, wherein said common rail comprises a housing, and a pressure detection apparatus and a pressure adjustment apparatus installed on said housing, said housing comprises an inlet passage where a urea solution enters, an outlet passage where the urea solution flows out, a plurality of conveyance ports connected to said inlet passage, and a plurality of return flow ports connected to said outlet passage, said pressure detection apparatus is connected to said inlet passage, said pressure adjustment apparatus is connected between said inlet passage and said outlet passage, said pressure adjustment apparatus is able to connect or disconnect said inlet passage and said outlet passage; said urea injection system is also suitable for treating exhaust of a plurality of engines, said plurality of nozzles include a first nozzle used to inject a urea solution into a first exhaust pipe connected to a first engine and a second nozzle used to inject a urea solution into a second exhaust pipe connected to a second engine, wherein said fluid conveying apparatus comprises an integrated cabinet, a pump installed in said integrated cabinet, an inlet pipeline connected to said pump, and an outlet pipeline connected to said pump, said pump comprises a motor located at the bottom, a pump head located at the top, and a magnetic coupling portion located between said motor and said pump head, said pump head, said magnetic coupling portion, and said motor are arranged from the top down, and a U-shaped flow path and a gear mechanism located in the very bottom of said flow path are provided in said pump head.

6. The urea injection system as claimed in claim 5, wherein said inlet pipeline and said outlet pipeline are respectively connected to the two ends of said flow path, and said inlet pipeline, said outlet pipeline, and said pump head are interconnected to form the shape of an inverted U.

7. The urea injection system as claimed in claim 6, wherein said integrated cabinet is equipped with a bottom wall, said inlet pipeline is equipped with a pre-pump monitoring module near said bottom wall, an inlet pipe connecting said pre-pump monitoring module and extending vertically, and an inlet connection pipe connecting said inlet pipe and said pump head; said outlet pipeline is equipped with a post-pump monitoring module near said bottom wall, an outlet pipe connecting said post-pump monitoring module and extending vertically, and an outlet connection pipe connecting said outlet pipe and said pump head.

8. The urea injection system as claimed in claim 7, wherein a negative pressure sensor and a urea temperature sensor are installed on said pre-pump monitoring module, a pressure sensor is installed on said post-pump monitoring module, said pre-pump monitoring module and said post-pump monitoring module both pass through said bottom wall, a urea extraction interface is provided in said pre-pump monitoring module, a urea output interface is provided in said post-pump monitoring module, and said urea extraction interface and said urea output interface are both located at the bottom of said integrated cabinet; said magnetic coupling portion comprises a driving magnetic driver and a driven magnetic driver, a pump head input shaft is provided on said driven magnetic driver, said pump head input shaft is connected to said gear mechanism, and said controller is located in said integrated cabinet.

9. A urea injection system, comprising:
- a fluid conveying apparatus used for extracting a urea solution from a urea tank,
- a plurality of nozzles used for injecting a urea solution into the exhaust pipe,
- a plurality of urea solution distribution connectors connected between said fluid conveying apparatus and said plurality of nozzles, and
- a controller used for controlling said urea injection system, wherein said urea injection system is also suitable for treating exhaust of a plurality of engines, said plurality of nozzles include a first nozzle used to inject a urea solution into a first exhaust pipe connected to a first engine and a second nozzle used to inject a urea solution into a second exhaust pipe connected to a second engine; said urea injection system comprises a first inflow pipe and a first return flow pipe connected to the first nozzle, and a second inflow pipe and a second return flow pipe connected to the second nozzle; said plurality of urea solution distribution connectors include a first tee connector and a second tee connector connected in series, wherein said first tee connector is equipped with an outlet connected to said first inflow pipe, and said second tee connector is equipped with an outlet connected to said second inflow pipe.

* * * * *